(12) United States Patent
Ishikawa et al.

(10) Patent No.: US 7,106,666 B2
(45) Date of Patent: Sep. 12, 2006

(54) OPTICAL DISK APPARATUS AND METHOD CAPABLE OF COMPENSATING FOR INSTABILITY TRACK JUMP AND FOCUS JUMP

(75) Inventors: Yoshinori Ishikawa, Yokohama (JP); Yukinobu Tada, Yokohama (JP); Motoyuki Suzuki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 276 days.

(21) Appl. No.: 10/682,234

(22) Filed: Oct. 10, 2003

(65) Prior Publication Data

US 2004/0156275 A1    Aug. 12, 2004

(30) Foreign Application Priority Data

Feb. 7, 2003    (JP) ............................ 2003-031092

(51) Int. Cl.
*G11B 21/08* (2006.01)
(52) U.S. Cl. .................................. 369/30.1; 369/53.29
(58) Field of Classification Search .................. None
See application file for complete search history.

(56) References Cited

U.S. PATENT DOCUMENTS 5,742,568 A * 4/1998 Nakano et al. ............ 369/30.1

FOREIGN PATENT DOCUMENTS

JP        8-161840      6/1998
JP        2000-20967 A  1/2000

* cited by examiner

*Primary Examiner*—Tan Dinh
(74) *Attorney, Agent, or Firm*—McDermott Will & Emery LLP

(57) ABSTRACT

During a normal operation, a tracking control signal from a tracking controller is supplied to an adder via a first switch and to a radial deviation component detector. The radial deviation component detector determines a radial deviation component EC of AC caused by radial deviation of an optical disk from the tracking control signal and supplied that component to the adder via another switch. For a track jump, the first switch is turned OFF, cutting off the tracking control signal. Thus, the radial deviation component EC and a jump pulse signal from a jump signal generator are added together by the adder. However, an offset of the tracking control signal TC detected by a DC component detector is further added. To avoid instability, the track jump is compensated so as to be normally carried out even if a DC offset is added to a tracking control signal.

9 Claims, 12 Drawing Sheets

OPTICAL DISK APPARATUS AND METHOD CAPABLE OF COMPENSATING FOR INSTABILITY TRACK JUMP AND FOCUS JUMP

BACKGROUND OF THE INVENTION

1. Field of the Invention

The present invention relates to an optical disk apparatus for optically performing playback from a disk or recording on and playback from the disk, and particularly to an optical disk apparatus for performing a track jump and a focus jump necessary to effect an interlayer Jump on a disk having a plurality of recording layers.

2. Description of the Related Art

In an optical disk such as a compact disk (hereinafter called a "CD"), a digital versatile disk (hereinafter called a "DVD"), focus control or tracking control has been performed which allows a laser spot to follow a recording layer or a recording track with high accuracy in order to accurately read and write information recorded on the optical disk.

With the increasing operational speed of recent CD and DVD, however, the influence of axial and radial deviations becomes large so that an accurate follow-up to the recording layer or recording track is becoming difficult. Therefore, information indicative of a relationship in position between an optical detecting means for data reading and an optical disk is stored in advance which acts as an axial run-out component or a radial run-out component, and thereafter the information is added to a drive signal of an optical pickup as a feedforward signal, thereby enabling high-accuracy focus control and tracking control (see Japanese Published Unexamined Patent Application No. Hei 8(1996)-161840, for example).

In order to read information from a desired track, a focus jump or track jump for moving a laser spot between recording layers or tracks is carried out. However, it becomes difficult to perform a stable jump operation with the speeding-up of rotation of a disk. Thus, in order to solve this problem, a stored axial deviation component or radial deviation component is added to a jump signal to thereby enable a stable jump operation (see Japanese Published Unexamined Patent Application No. 2000-20967, for example).

The above-described two known arts respectively have such a configuration that the axial run-out component or radial run-out component of the optical disk is stored in its corresponding memory and added to a servo drive signal as needed. It is therefore preferable that when these two known arts are applied simultaneously, the memory is used in common in terms of a cost reduction.

A configuration example in this case will next be described. Incidentally, since a focus system and a tracking system can make use of a similar configuration respectively, the tracking system will be explained in the following description.

FIG. 2 is a block diagram showing an optical disk apparatus using the conventional system referred to above. Reference numeral 1 denotes an optical disk, reference numeral 2 denotes an objective lens, reference numeral 3 denotes an optical pickup, reference numeral 4 denotes a signal processor, reference numeral 5 denotes an AD (Analog/Digital) converter. Reference numeral 6 denotes a tracking controller, reference numeral 7 denotes a spindle motor, reference numeral 8 denotes a rotation detection signal generator, reference numeral 9 denotes a rotational position detector, and reference numeral 10 denotes a radial deviation component detector. Reference numeral 11 denotes a jump signal generator, reference numerals 12 and 13 denote switches, reference numeral 14 denotes an adder, reference numeral 15 denotes a DA (Digital/Analog) converter. Reference numeral 16 denotes a driver circuit, reference numeral 17 denotes a CPU (Central Processing Unit), reference numeral 18 denotes a thread controller, reference numeral 19 denotes a driver circuit, reference numeral 20 denotes a thread motor. Reference numeral 21 denotes an optical pickup feed mechanism.

In the drawing, the optical disk 1 is irradiated with laser light to perform reading, erasure and writing of information. A laser light source (not shown) and a light rece 1 vlng device (not shown) are built in the optical pickup 3 used as optical detecting means. Also the optical pickup 3 is provided with the objective lens 2. Laser light emitted from the laser light source is applied to the optical disk 1 via the objective lens 2. At this time, the laser light is gathered by the objective lens 2, which in turn is focused on a desired recording layer or a recording track of the optical disk 1. In the case of the information reading, the light reflected from the optical disk 1 is received by the optical pickup 3 through the objective lens 2, where it is converted into an electric signal. The electric signal is supplied to the signal processor 4.

Also an actuator (not shown) 1S built in the optical pickup 3 and moves the objective lens 2 in a substantially radial direction of the optical disk 1 in accordance with a drive signal outputted from the driver circuit 16 (incidentally, it moves the objective lens 2 in the direction of thickness of the optical disk 1 in the case of the focus system).

A signal outputted from the optical pickup 3 is processed in the signal processor 4 where a tracking error signal TE corresponding to a deviation from a track on a spot of the laser light irradiated onto the optical disk 1 is generated. Thus, the tracking error signal TE is information indicative of the relationship of position between the optical detecting means and the optical disk 1. The information is converted into digital data by the AD converter 5 at a predetermined sampling period, followed by supply to the tracking controller 6 where it is subjected to a process of compensation for gain and each phase necessary to improve stability and followability of a tracking servo, after which it is outputted as a tracking control signal TC. The tracking control signal TC is supplied to the adder 14 via the switch 12 and even to the radial deviation component detector 10.

The spindle motor 7 rotates the optical disk 1 and outputs a signal synchronized with its rotation. The output signal of the spindle motor 7 is supplied to the rotation detection signal generator 8 where it is processed, after which the processed signal is outputted as a disk motor FG (frequency generation) signal synchronized with the rotation of the optical disk 1. The disk motor FG signal is supplied to the rotational position detector 9 where it is processed, so that a rotational position detection signal RP indicative of the absolute phase of the rotating optical disk 1 is generated. In the radial deviation component detector 1a, a radial deviation component EC used as an AC (Alternating Current) component caused by a radial deviation of the optical disk I, which is contained in the tracking control signal TC, is detected over a period corresponding to one rotation of the optical disk 1, on the basis of the rotational position detection signal RP, and then stored and held therein. This is repeatedly read and outputted. Accordingly, the radial deviation component EC represents a change in the position relationship between the optical detecting means and the optical disk 1 due to the radial deviation (axial deviation in the focus system). The radial deviation component EC is supplied to the adder 14 via the switch 13.

When a jump signal JS outputted from the CPU 17 is "L" (low level), the jump signal generator 11 outputs a jump pulse signal JP of "0". When the jump signal JS is "H" (high level), the jump signal generator 11 outputs a jump pulse signal JP of "1" or "−1" in accordance with acceleration or deceleration.

The switches 12 and 13 respectively perform ON (close) and OFF (open) operations according to control signals SC1 and SC2 outputted from the CPU 17. Assume that in the following description, when the control signals SC1 and SC2 are "L", the switches 12 and 13 are turned OFF, whereas when the control signals SC1 and SC2 are "H", the switches 12 and 13 are turned ON.

The adder 14 adds the jump pulse signal JP outputted from the jump signal generator 11, the tracking control signal TC supplied from the tracking controller 6 via the switch 12, and the radial deviation component EC supplied from the radial deviation component detector 10 via the switch 13. Digital added data outputted from the adder 14 is converted into an analog signal by the DA converter 15 at a predetermined period. Incidentally, the conversion periods of the AD converter 5 and the DA converter 15 are regarded to be the same here. The output signal of the DA converter 15 is amplified by the driver circuit 16, which in turn is supplied to the tracking actuator in the optical pickup 3 as its drive signal. In accordance with the drive signal, the objective lens 2 changes in its position in the radial direction of the disk 1.

The CPU 17 outputs an enable signal WR for the radial deviation component detector 1a, a jump signal JS for controlling the jump signal generator II, and control signals SC1 and SC2 for turning the switches 12 and 13 ON and OFF respectively.

The output signal of the adder 14 is supplied to the thread controller 18 where the gain for improving followability of a thread servo is compensated. Incidentally, the thread controller 18 controls the position of the optical pickup 3 in such a manner that the objective lens 2 moved by the tracking actuator in the optical pickup 3 does not exceed its travelling limit. A signal outputted from the thread controller 18 is amplified by the driver circuit 19, followed by being supplied to the thread motor 20 as a drive signal. Thus, the thread motor 20 drives the optical pickup feed mechanism 21 to move the optical pickup 3 in an inner peripheral or outer peripheral direction of the optical disk 1.

The operation of the optical disk apparatus having the above configuration will next be explained using FIGS. 2, 3 and 4.

FIGS. 3 and 4 are respectively waveform diagrams showing signals at the respective portions in FIG. 2.

Referring to FIG. 3, until a time t1 that elapses since the start of the rotation of the optical disk I, the jump signal JS outputted from the CPU 17 is set to "L", the control signal SCI for the switch 12 is set to "H", and the control signal SC2 for the switch 13 is set to "L", respectively. At this time, the jump signal generator 11 has already outputted the jump pulse signal JP of "0" (that is, no jump pulse signal JP is outputted). Further, the switch 12 is held ON, and the switch 13 is held OFF. Therefore, the tracking servo becomes a closed loop so that tracking control is performed on a steady basis. Further, the CPU 17 has already supplied the enable signal WR of "L" to the radial deviation component detector 10 (that is, no enable signal WR is not supplied to the radial deviation component detector 10). Thus, the radial deviation component detector 10 does not perform the operation of detecting the radial deviation component EC.

FIG. 3 line (a) shows the tracking error signal TE outputted from the signal processor 4. Since tracking suppression gain is not sufficient, a component synchronized with a period equivalent to one rotation of the optical disk 1 appears.

FIG. 3 line (b) shows the tracking control signal TC outputted from the tracking controller 6. The tracking control signal TC is one obtained by compensating for the gain and phase of the tracking error signal TE. The tracking control signal TC is digital data but expressed in analog form for convenience.

Here, FIG. 4 line (a) shows the disk motor FG signal outputted from the rotation detection signal generator 8. Assume here that the disk motor FG signal is generated with 6 periods or cycles per rotation of the optical disk 1. FIG. 4 line (b) shows a rotation synchronizing signal ROT generated by the rotational position detector 9, which is one synchronized every 6 cycles of the disk motor FG signal shown in FIG. 4 line (a).

Further, the rotational position detector 9 outputs a multiplication signal obtained by effecting a multiplication on the disk motor FG signal, which is shown in FIG. 4 line (c). Assume that the rotational position detector 9 measures a period T1 of the disk motor FG signal and outputs, twice, signals each having a time T/1;2 equivalent to one-half the measured period T1 as a period as viewed from the next period of the disk motor FG signal, thereby generating the multiplication signal shown in FIG. 4 line (c) in which the frequency of the disk motor FG signal is set twice. Further, the rotational position detector 9 has a counter which is reset in response to the rotation synchronizing signal ROT and counts up at both edges of the multiplication signal. A value counted by the counter is outputted as a rotational position detection signal RP. FIG. 4 line (d) shows the rotational position detection signal RP. The counted value changes from 0 to 23 during a period of one rotation of the optical disk 1. Such counted values represent sequential positions (phases) for each round on the optical disk 1.

As shown in FIG. 3 line (c), the CPU 17 set the enable signal WR to "H" during a period of a time t1 to a time t2. Thus, the radial deviation component detector 10 is operated with a memory built therein being set as write enable. The radial deviation component detector 10 set the rotational position detection signal RP supplied from the rotational position detector 9 as address data for the memory, and extracts a radial deviation component EC of the optical disk 1 from the tracking signal TC supplied from the tracking controller 6 and stores it. This is repeatedly read and outputted.

The operation of the radial deviation component detector 10 will now be explained.

FIG. 5 is a block diagram showing a configuration example of the radial deviation component detector 10. Reference numeral 10a denotes a BPF (BandPass Filter), and reference numeral 10b denotes a memory. Portions associated with those shown in FIG. 2 are respectively identified by the same reference numerals, and the description of certain common ones will therefore be omitted.

In the same drawing, the radial deviation component detector 10 comprises the BPF 10a and the memory 10b. The center frequency of the BPF 10a is set to a rotational frequency (frequency of a radial deviation) of the optical disk 1 (FIG. 2). The radial deviation component detector 10 extracts a radial deviation component caused by the radial deviation of the optical disk 1 at the tracking control signal TC (FIG. 3 line (b)). The memory 10b is in a write enable state (write state). However, a read state is allowed) by the enable signal WR of "H" during the period of the times t1 to t2 (FIG. 3). A signal outputted from the BPF 10a is set as input data, and a rotational position detection signal RP outputted from a rotational position detector 9 is set as address data, whereby the writing of the input data is performed. As shown in FIG. 4 line (d), the rotational position detection signal RP is one in which the value changes from 0 to 23 during one rotation period of the disk 1 and which represents the sequential rotational phases of the optical disk 1. Therefore, the memory 10b stores the tracking control signal TC (i.e., radial deviation component) supplied via the BPF 10a under the sequential rotational phases of the optical disk 1. The period between the times t1 and t2 in which the enable signal WR shown in FIG. 3 line (c) is "H", is a period during which the radial deviation component extracted at the BPF 10a is written into the memory 10b. The period is set to more than or equal to one rotation period of the optical disk 1. Thus, the radial deviation component corresponding to one rotation period of the optical disk 1 is stored in the memory 10b.

The recorded radial deviation component is immediately read from the memory 10b and outputted from the radial deviation component detector 10 as a radial deviation component EC. FIG. 3 line (d) shows the radial deviation component EC outputted from the memory 10b. When the enable signal WR reaches "L", the memory 10b completes its write operation and performs its reading alone. Thus, the radial deviation component corresponding to one rotation period of the optical disk 1 is repeatedly read from the memory 10b in sync with the rotation of the optical disk I, which is outputted from the radial deviation component detector 10 as the radial deviation component EC. Incidentally, the memory 10b may be a memory wherein after the completion of recording of the radial deviation component corresponding to one rotation period of the optical disk I, its reading is started.

FIG. 6 is a block diagram showing another example of the radial deviation component detector 10. Reference numeral 10c denotes an LPF (Lowpass Filter), reference numeral 10d denotes a memory, reference numeral 10e denotes an average arithmetic circuit, and reference numeral 10f denotes a subtractor. Portions associated with those shown in FIG. 2 are respectively identified by the same reference numerals, and the description of certain common ones will therefore be omitted.

In the same drawing, the radial deviation component detector 10 comprises the LPF 10c, the memory 10d, the average arithmetic circuit 10e, and the subtractor 10f. The cut-off frequency of the LPF 10c is set to about several times to ten times the rotational frequency of the optical disk 1. The radial deviation component detector 10 extracts a wave obtained by combining a radial deviation component contained in a tracking control signal TC and its harmonic component together. Since the radial deviation component is not a monotonous sin wave in most cases, there is a possibility that the radial deviation component detector will be able to detect the radial deviation component faithfully as compared with the radial deviation component detector 10 having the configuration shown in FIG. 5. The memory 10d operates in a manner similar to the memory 10b shown in FIG. 5 (thus, the present memory 10d may be such a memory that after the completion of recording of the radial deviation component corresponding to one rotation period of the optical disk 1, its reading is started). During a period in which an enable signal WR is "H", a rotational position detection signal RP Js set as address data, and a signal outputted from the LPF 10c is stored and repeatedly outputted. The output signal of the memory 10d is averaged by the average arithmetic circuit 10e, so that a DC (Direct Current) offset (i.e., DC component) caused by the position relationship between the objective lens 2 and the optical pickup 3 is extracted. The output signal of the memory 10d is subtracted from the output signal of the average arithmetic circuit 10e by the subtractor 10f, so that the DC offset is eliminated to obtain a radial deviation component EC composed of an AC (Alternating Current) component. The radial deviation component EC is supplied to the switch 13 (FIG. 2).

Incidentally, since the center frequency of the BPF 10a is set to the rotational frequency of the disk 1 in the radial deviation component detector 10 shown in FIG. 5, the DC component is sufficiently attenuated with respect to the output signal thereof.

Referring to FIGS. 2 and 3, at the time t3 after the enable signal WR is set to "L", the CPU 17 brings the control signal SC2 to "H" to turn ON the switch 13 as shown in FIG. 3 line (e). Thus, the radial deviation component EC outputted from the radial deviation component detector 10 is supplied to the adder 14 via the switch 13 where it is added to the tracking control signal TC outputted from the tracking controller 6. FIG. 3 line (f) shows a radial deviation component EC outputted through the switch 13.

The radial deviation component EC outputted through the switch 13 is an AC component and changes the position of the objective lens 2 as a feedforward signal. Namely, the radial deviation component is stored in the radial deviation component detector 10 (FIGS. 5 and 6) and applied to a tracking servo loop as a feedforward signal, thereby making it possible to suppress the AC component caused by the radial deviation of the optical disk 1. Since, at this time, the feedback loop of the tracking system suppresses the remaining DC component caused by the radial deviation, the tracking error signal TE (FIG. 3 line (a)) and the tracking control signal TC (FIG. 3 line (b)) respectively change with the DC component caused by the radial deviation as a main component after the time t3. Further, since the DC gain of the tracking servo loop is high like about 60 dB to about 80 dB, the DC component can be sufficiently suppressed.

FIG. 7 is a waveform diagram showing signals at the respective portions of FIG. 2 where a track jump is preformed from the state in which as described above, the radial deviation component is stored and applied to the tracking servo loop as the feedforward signal, wherein FIG. 7 line (a) shows a tracking error signal TE, FIG. 7 line (b) illustrates a control signal SC1 of the switch 12, FIG. 7 line (c) depicts a jump signal JS, FIG. 7 line (d) shows a jump pulse signal JP, FIG. 7 line (e) illustrates an output signal (radial deviation component EC) of the switch 13, and FIG. 7 line (f) depicts a signal outputted from the DA converter IS, respectively.

In FIG. 7, there exists a continuation from the time t3 of FIG. 3 till a time t4, and the tracking control is being performed. During a track jump period between the time t4 and a time t5, the CPU 17 brings the control signal SC1 to "L" to turn OFF the switch 12. In doing so, the tracking loop is brought to an open state so that the tracking control is not performed. Also the CPU 17 brings the jump signal JS to "R" during the track jump period between the times t4 and t5. Thus, as shown in FIG. 7 line (d), the jump signal generator 11 generates an accelerating pulse necessary to allow an optical spot to jump to an adjacent track on the optical disk 1. Then the jump signal generator 11 generates a jump pulse signal JP consisting of the accelerating pulse and a decelerating pulse for pulling back the optical spot accelerated by the accelerating pulse in such a manner that the optical spot does not jump over the adjacent track and overreach it, and outputs it therefrom. The jump pulse signal JP is added to the radial deviation component EC outputted through the switch 13 by the adder 14, the added result of which is supplied to the thread controller 18 and the DA converter 15. Thus, during the track jump period between the times t4 and t5, as shown in FIG. 7 line (f), the output signal of the DA converter 15 results In a signal obtained by adding accelerating and decelerating voltages of the jump pulse signal JP to the radial deviation component EC of the optical disk 1, which is indicated with a dotted line. Therefore, the optical disk 1 enables a stable track jump without being affected by its radial deviation.

SUMMARY OF THE INVENTION

Meanwhile, there may be cases in which the optical disk apparatus having the configuration shown in FIG. 2 is in a so-called lens-shift produced state that the center position between the objective lens 2 and the optical pickup 3 is shifted with the reading of information from the optical disk 1. FIG. 8 is a waveform diagram showing signals at the respective portions at this time.

In such a case, the tracking error signal TE outputted from the signal processor 4 and the tracking control signal TC outputted from the tracking controller 6 in FIG. 2 are stabilized in a state of being added with a DC offset. Thus, the output signal of the DA converter 15 results in one added with a DC offset A as shown in FIG. 8 line (d).

In this case, the output signal of the DA converter 15 at the track jump period between the times t4 and t5 results in one obtained by adding a jump pulse signal JP (FIG. 8 line (b)) and a radial deviation component EC (FIG. 8 line (c)) supplied through the switch 13. However, when the tracking control signal TC is added with the DC offset A as described above, no DC component is contained in the radial deviation component EC as described in FIGS. 5 and 6, with the result that the jump pulse signal JP shown in FIG. 8 line (b) is added to the radial deviation component EC excluding the DC offset A shown in FIG. 8 line (c) during the track jump period. Therefore, as viewed from the radial deviation component EC indicated by a broke line, which is added with the DC offset A, the amplitude of an accelerating voltage of the jump pulse signal JP is reduced by the DC offset A, and the amplitude of a decelerating voltage of the jump pulse signal JP is increased by the same offset, during the track jump period as shown in FIG. 8 line (d).

In such a case, the output signal of the DA converter 15 has been added with the DC offset A and the tracking control has been stabilized as described above. Therefore, when the track jump is caused to carry out properly in such a state, the jump pulse signal JP must have been added to the radial deviation component EC added with the DC offset A so as to reach the prescribed amplitude as viewed from the radial deviation component EC as shown in FIG. 7 line (f) as the output signal of the DA converter 15 at the track jump period.

However, since the jump pulse signal JP is added to the radial deviation component EC composed of the AC component by the adder 14, the jump pulse signal JP is added by the adder 14 so as to reach the prescribed amplitude as viewed from the radial deviation component EC excluding the DC offset A. Therefore, the amplitudes of the accelerating and decelerating voltages are represented as shown in FIG. 8 line (d) as viewed from the radial deviation component EC added with the DC offset A, so that the track jump is not performed stably.

Incidentally, as another method of the track jump, for solving such a problem, there is known a method of, as shown in FIG. 9, holding a value obtained by adding a radial deviation component EC and a tracking control signal TC set immediately before the start of a track jump during a track jump period, and adding accelerating and decelerating voltages of a jump pulse signal JP to its hold voltage. When a track jump period between times t4 and t5 is much shorter than the rotational period of the optical disk 1, the present method is effective.

However, when the track jump period becomes short with the speeding-up of the number of rotations of a disk, the inclination of a tracking error signal at the zero crossing increases (see FIG. 9 line (a)), and hence the resolution of the tracking error signal TE becomes coarse. Therefore, an error occurs in the timing provided for the zero crossing detection of the tracking error signal TE, i.e., the timing provided to apply the decelerating voltage, so that a stable track jump cannot be carried out.

In order to solve such a problem, the sampling frequency of the tracking error signal TE may be increased, but it leads to the occurrence of an increase in power consumption. Therefore, even if the rotational frequency of the optical disk 1 becomes high, the track jump period cannot be shortened in proportion to it. Thus, when the rotational frequency of the optical disk 1 becomes high, the use of the hold-jump's method shown in FIG. 9 falls into difficulties.

A method of reducing a track pitch and enhancing the recording density of an optical disk is generally intended for the development of a recent optical disk. However, the influence of its radial deviation becomes larger than ever before.

An object of the present invention is to provide an optical disk apparatus that solves the foregoing problems, avoids the influence of high-accuracy servo control and axial and radial deviations, and enables compatibility between stable focus and track jumps.

In order to attain the above object, the present invention provides an optical disk apparatus which comprises an optical detecting unit for reading information recorded on a disk. A position detecting unit detects position information which is indicative of a position relationship between the optical detecting unit and the disk and depends on a state of rotation of the disk. An AC component detecting unit detects and stores an AC component of the position information obtained by the position detecting unit and outputs the AC component of the stored position information. A DC component detecting unit for detecting a DC component of the position information obtained by the position detecting unit. A jump signal generating unit generates a jump pulse signal for stepwise moving the optical detecting unit relative to the disk. An arithmetic unit upon reading of information from the disk, generates a drive signal of the optical detecting unit from the position information detected by the position detecting unit and the AC component of the position information outputted from the AC component detecting unit. The arithmetic unit also generates a drive signal of the optical detecting unit from the AC component of the position information outputted from the AC component detecting unit, the DC component of the position information detected by the DC component detecting unit, and the jump pulse signal generated by the jump signal generating unit during a jump period in which the optical detecting unit is stepwise moved relative to the disk.

Also the present invention provides an optical disk apparatus which comprises an optical detecting unit for reading information recorded on a disk and a position detecting unit for detecting position information which is indicative of a position relationship between the optical detecting unit and the disk and depends on a state of rotation of the disk. An AC component detecting unit detects and stores an AC component of the position information obtained by the position detecting unit and outputs the AC component of the stored position information. A first DC component detecting unit generates a DC component of the position information from the position information and the AC component. A jump signal generating unit generates a jump pulse signal for stepwise moving the optical detecting unit relative to the disk. An arithmetic unit for, upon reading of information from the disk, generates a drive signal of the optical detecting unit from the position information detected by the position detecting unit and the AC component of the position information outputted from the AC component detecting unit. The arithmetic unit also generates a drive signal of the optical detecting unit from the AC component of the position information outputted from the AC component detecting unit, the DC component of the position information detected by the first DC component detecting unit, and the jump pulse signal generated by the jump signal generating unit during a jump period in which the optical detecting unit is stepwise moved relative to the disk.

Further, the present invention provides an optical disk apparatus further including a second DC component detecting unit for detecting a DC component of the position information obtained by the position detecting unit from the position information. Either one of the DC component of the position information generated by the first DC component detecting means and the DC component of the position information detected by the second DC component detecting unit is selectively supplied to the arithmetic means.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFFERED EMBODIMENTS

Figure 1:
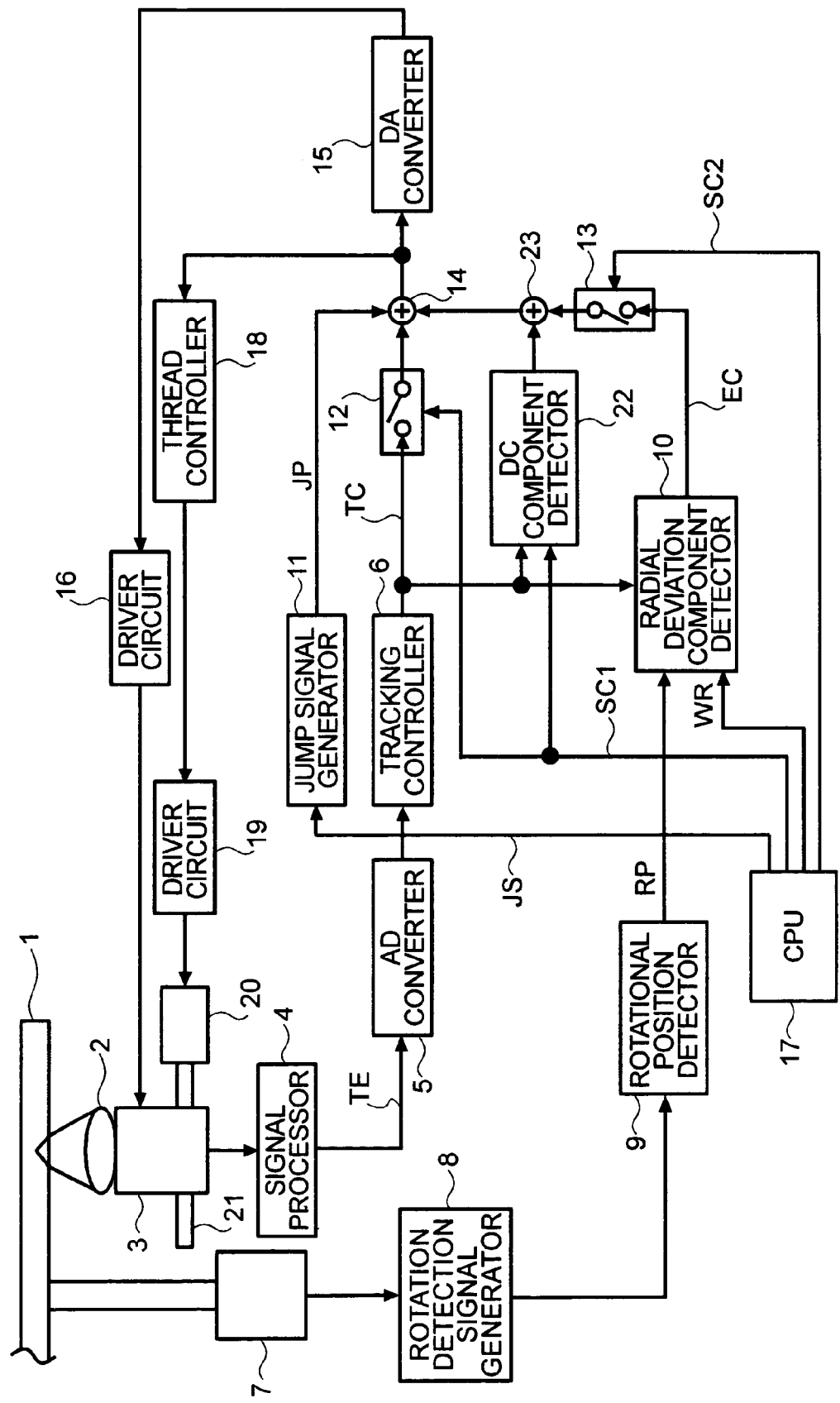
FIG. 1 is a block diagram showing a first embodiment of an optical disk apparatus according to the present invention.

Preferred embodiments of the present invention will hereinafter be described with reference to the accompanying drawings.

Reference numerals used in the drawings are as follows:

Reference numeral 1 denotes an optical disk; 2 an objective lens; 3 an optical pickup; 4 a signal processor; 5 an AD converter; 6 a tracking controller; 7 a spindle motor; 8 a rotation detection signal generator; 9 a rotational position detector; 10 and 10' radial deviation component detectors; 10a a bandpass filter; 10b a memory; 10c a lowpass filter; 10d a memory; 10e average arithmetic circuit; 10f a subtractor; 10g a latch; 10h a subtractor; 11a jump signal generator; 12 and 13 switches; 14 an adder; 15 a DA converter; 16 a driver circuit; 17 a CPU; 18 a thread controller; 19 a driver circuit; 20 a thread motor; 21 a pickup feed mechanism; 22 and 22' DC component detectors; and 23 an adder.

FIG. 1 is a block diagram showing a first embodiment of an optical disk apparatus according to the present invention. Reference numeral 22 denotes a DC component detector, and reference numeral 23 denotes an adder. Portions and signals corresponding to those shown in FIG. 2 are respectively identified by the same reference numerals, and the description of certain common ones will therefore be omitted.

Figure 2:
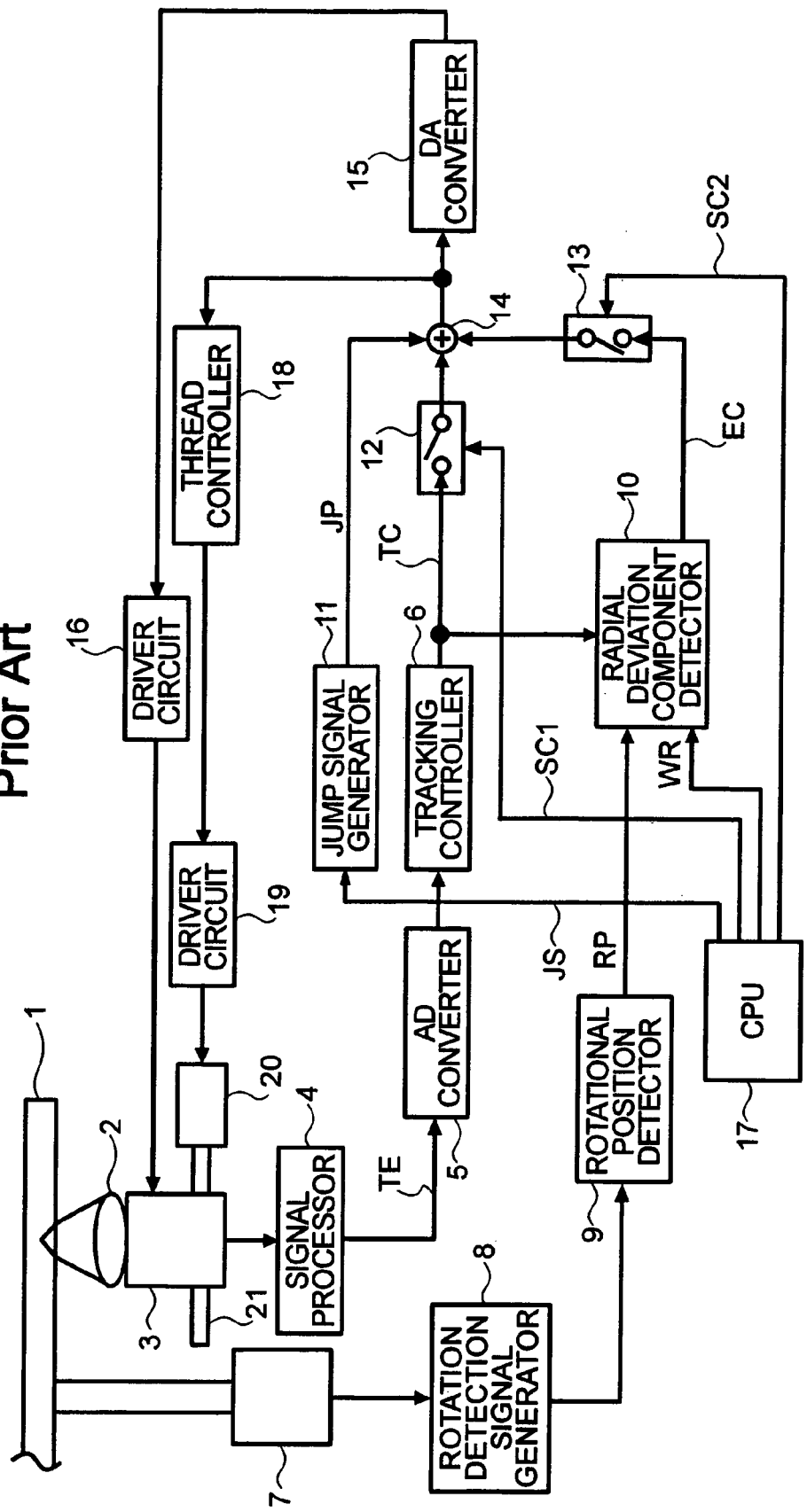
FIG. 2 is a block diagram illustrating an optical disk apparatus of a conventional system.
Figure 3:
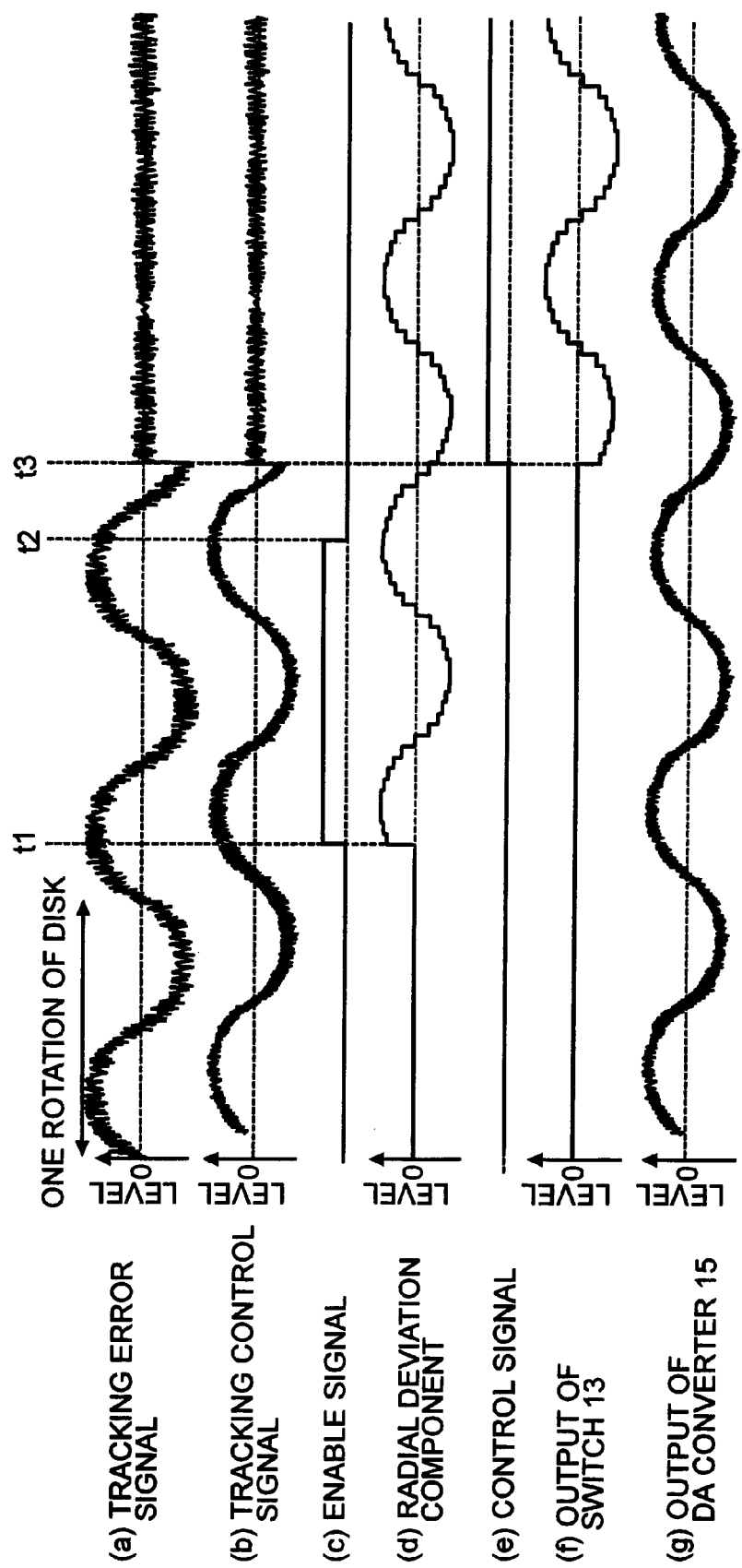
FIG. 3 is a waveform diagram depicting signals at respective portions, which are used for feed forward control at the optical disk apparatus shown in FIG. 2.

In the same figure, the first embodiment shows one in which the DC component detector 22 and the adder 23 are added to the conventional optical disk apparatus shown in FIG. 2. Configurations other than this configuration are similar to the conventional optical disk apparatus shown in FIG. 2.

A tracking control signal TC outputted from the tracking controller 6 is supplied to the switch 12 and the radial deviation component detector 10 and even to the DC component detector 22 where a DC (Direct Current) component having a frequency lower than a radial deviation component EC of an AC (Alternating Current) component is detected from the tracking control signal TC. The DC component detector 22 can be made up of an LPF or the like.

The DC component extracted from the DC component detector 22 is outputted during a track jump period in which a control signal SC1 reaches "H", and is supplied to the adder 23 where it is added to the radial deviation component EC supplied via the switch 13. A signal outputted from the adder 23 is supplied to the adder 14. Thus, the adder 14 is supplied with a signal obtained by adding the DC component of the tracking control signal TC to the radial deviation component EC of the AC component from the switch 13.

Figure 10:
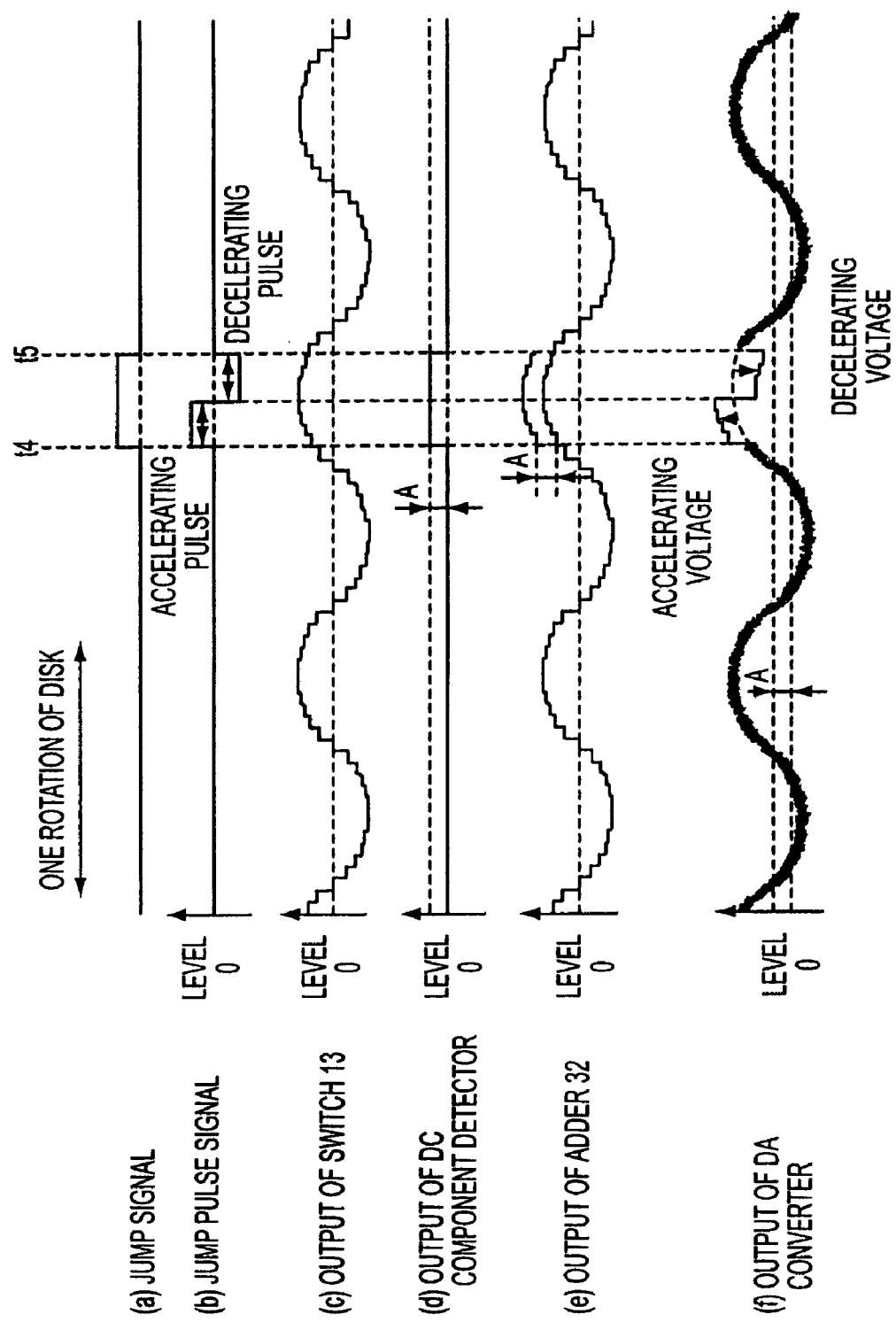
FIG. 10 is a waveform diagram showing signals at respective portions in FIG. 1.

The operation of the first embodiment will next be described with reference to FIG. 10. FIG. 10 is a waveform diagram showing signals at the respective portions of FIG. 1. FIG. 10 line (a) shows a jump signal JS, FIG. 10 line (b) illustrates a jump pulse signal JP, FIG. 10 line (c) depicts a radial deviation component EC outputted through the switch 13, FIG. 10 line (d) shows a DC component outputted from the DC component detector 22, FIG. 10 line (e) illustrates a signal outputted from the adder 23, and FIG. 10 line (f) depicts a signal outputted from the DA converter 15.

The DC component detector 22 detects a DC component (i.e., portion free of a change in the positional relationship between the optical detecting means and the optical disk 1 or portion slow in its change) of a disk rotational frequency or less, which is contained in the tracking control signal TC, and outputs it as the DC offset A during a track jump period between a time t4 to a time t5 as shown in FIG. 10 line (d). Thus, the output signal of the adder 23 is a signal obtained by adding the radial deviation component EC outputted through the switch 13 shown in FIG. 10 line (c) and the DC component outputted from the DC component detector 22 during the track jump period between the times t4 and t5 as shown in FIG. 10 line (e). Accordingly, the output signal is equivalent to one obtained by adding the DC offset A to the radial deviation component EC of the AC component. Therefore, the output of the DA converter 15 results in one obtained by adding, in the form of the normal amplitude, an accelerating voltage and a decelerating voltage of the jump pulse signal JP shown in FIG. 10 line (b) to the radial deviation component EC added with the DC offset A and shown with a dotted line even during the track jump period between the times t4 to t5 as shown in FIG. 10 line (f).

Thus, the first embodiment makes it possible to carry out a stable track jump without being subjected to the influence of radial deviations.

A second embodiment of the present invention will next be described.

As access operations of the optical disk apparatus, there are known a coarse seek for moving the optical pickup 3 in order to shift the objective lens 2 by a distance more than or equal to its movable range, a dense seek for moving only the objective lens 2 within the movable range of the objective lens 2, etc. However, an optical spot might land on a track slightly shifted from an intended track due to the influence of radial deviations or the like. Therefore, after the completion of the corresponding seek, a fine adjustment is made to its movement such that the optical spot arrives at the intended track by repetition of a track jump, thereby leading to completion of the access operation thereof. In this case, the DC offset A contained in the tracking control signal TC outputted from the tracking control circuit 6 changes after the coarse seek or dense seek.

Since the cut-off frequency of the DC component detector 22 shown in FIG. 1 is lower than the disk rotational frequency, the time constant is long, and the time required to allow the optical disk 1 to be turned one rotation or more is needed until the output of the DC component detector 22 is stabilized. Since it is necessary to await the stabilization of the output of the DC component detector 22 from this point of view where the track Jump is carried out after the coarse seek or dense seek, this will result in an increase in access time. The second embodiment of the present invention is intended to solve such problems.

Figure 11:
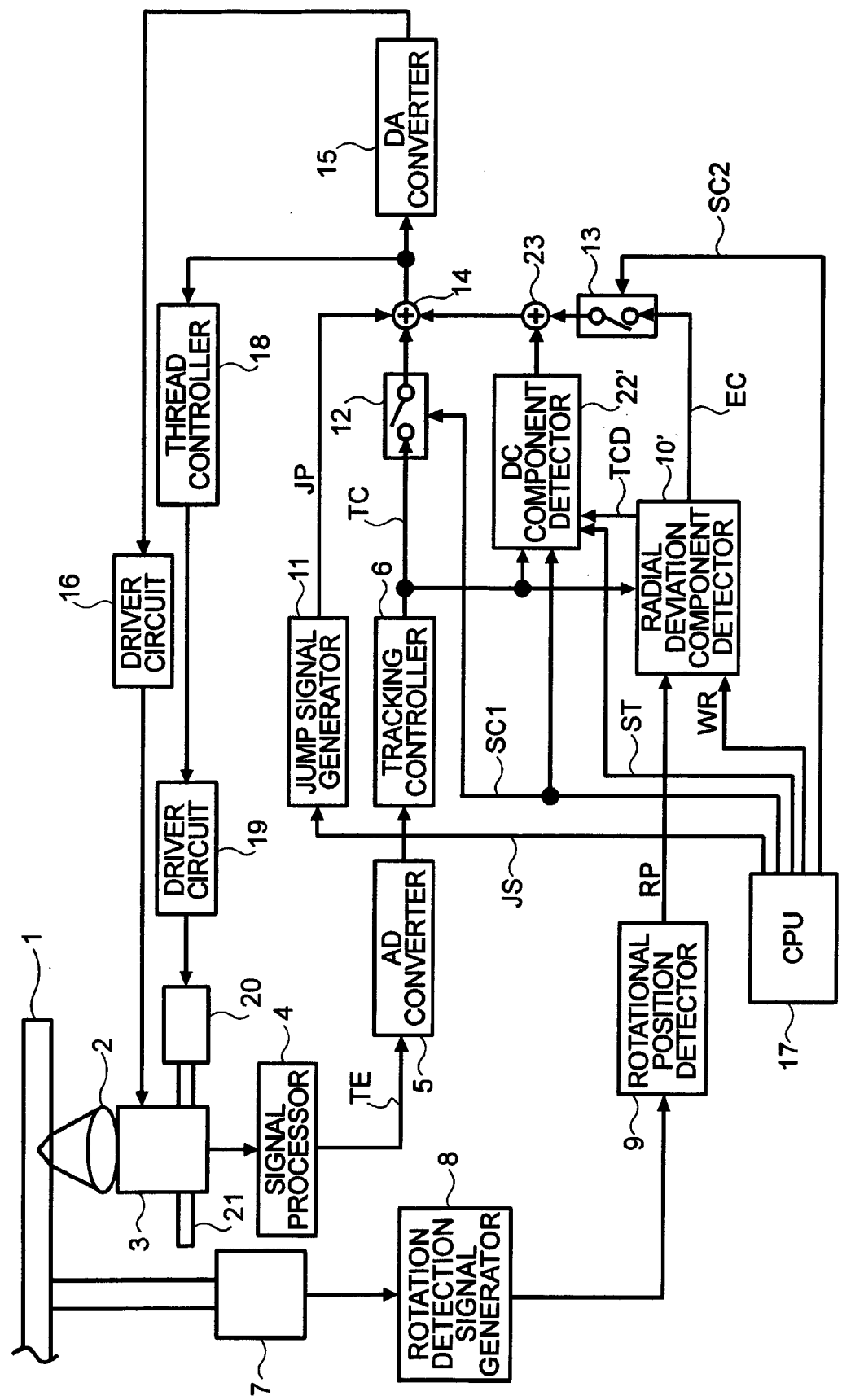
FIG. 11 is a block diagram illustrating a second embodiment of an optical disk apparatus according to the present invention.

FIG. 11 is a block diagram showing the second embodiment of the optical disk apparatus according to the present invention. Reference numeral 10' denotes a radial deviation component detector, and reference numeral 22' denotes a DC component detector. Portions and signals associated with those shown in FIG. 1 are respectively identified by the same reference numerals, and the description of certain common ones will therefore be omitted.

In the same Figure, while the radial deviation detector 10' detects a radial deviation component EC of an AC component from a tracking control signal TC and outputs it therefrom in a manner similar to the radial deviation detector 10 employed in the first embodiment shown in FIG. 1, the radial deviation detector 10' further extracts even a DC component TCD of the tracking control signal TC and supplies it to the DC component detector 22'.

Upon the access operation of the optical disk apparatus as described above, there is a need to read information of an optical disk 1 to obtain a sector address with a view toward making a decision as to whether an optical spot reaches an intended or target track after the coarse seek or dense seek.

Therefore, the reading of information is always performed after the above seek.

A set signal ST is supplied from a CPU 17 to the DC component detector 22'. When the set signal ST changes from "L" to "H", the DC component TCD outputted from the radial deviation component detector 1a' is set to the DC component detector 22' with its timing.

Thus, upon reading the information after the seek, the CPU 17 changes the set signal ST from "L" to "H" to thereby set the DC component TCD to the DC component detector 22' with its timing. Then when the CPU 17 sets a track jump period control signal SC1 to "L" upon allowing a post-seek optical spot to track-jump to a target track, the DC component detector 22' outputs the set DC component TCD to an adder 23 during its period. Thus, during the track jump period, a radial deviation component EC added with the DC component TCD as an offset B is supplied to the adder 23, and a jump pulse signal JP outputted from a jump signal generator 11 is added to it. At this time, a switch 12 is held OFF and no tracking control signal TC is supplied to an adder 14.

Thus, even if the DC component of the radial deviation of the optical disk 1 changes and the offset B of the tracking control signal TC changes after the seek operation; a signal obtained by adding the jump pulse signal JP to a radial deviation component EC having a DC offset B substantially equal to the offset B of the tracking control signal TC at that time is outputted from the adder 14 during the track jump period. Thus, the track jump is normally performed. Accordingly, it is not necessary to await the stabilization of tracking control after the seek, that is, even if the track jump is carried out before the stabilization of the tracking control, the normal track jump is performed, so a quick and accurate access to a target track is enabled.

When the access operation is completed and the tracking control is stabilized, the DC component detector 22' is switched to a state of being able to output the DC component extracted from the tracking control signal TC, so that the DC component detector 22' outputs the DC component to the adder 23 in a manner similar to the first embodiment shown in FIG. 1 during the track jump period in which the CPU 17 sets the control signal SC1 to "L".

Figure 12:
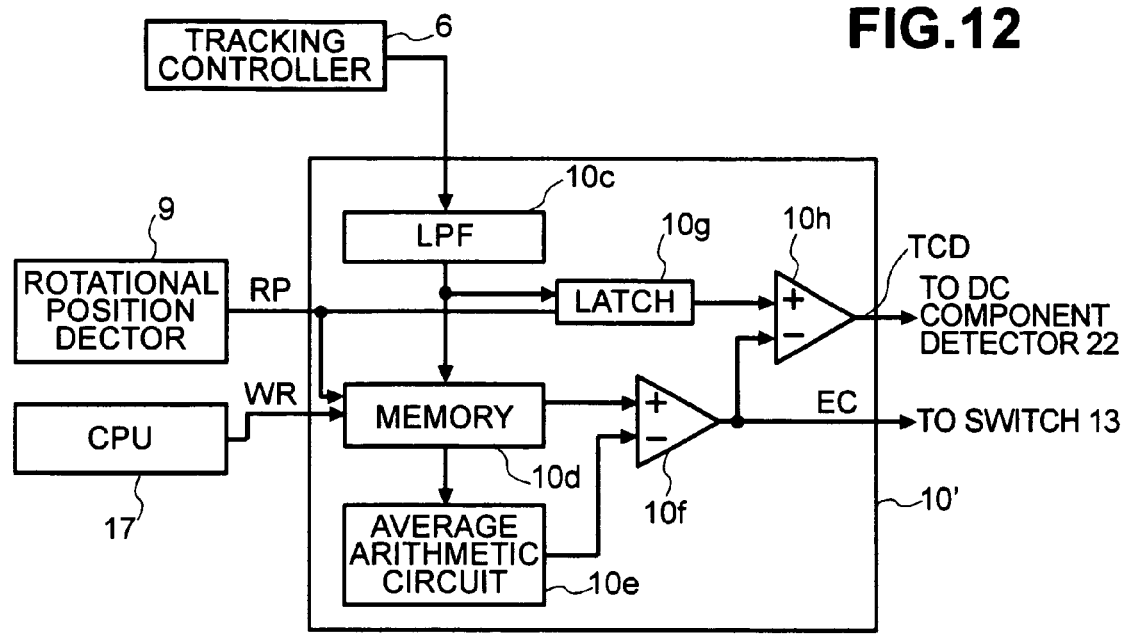
FIG. 12 is a block diagram depicting one specific example of a radial deviation component detector shown in FIG. 11.

FIG. 12 is a block diagram showing one specific example of the radial deviation component detecting circuit 10' shown in FIG. 11. Numeral 10g denotes a latch, and numeral 10h indicates a subtractor, respectively. Portions associated with those shown in FIG. 6 are respectively identified by the same reference numerals and the description of certain common ones will therefore be omitted.

Figure 6:
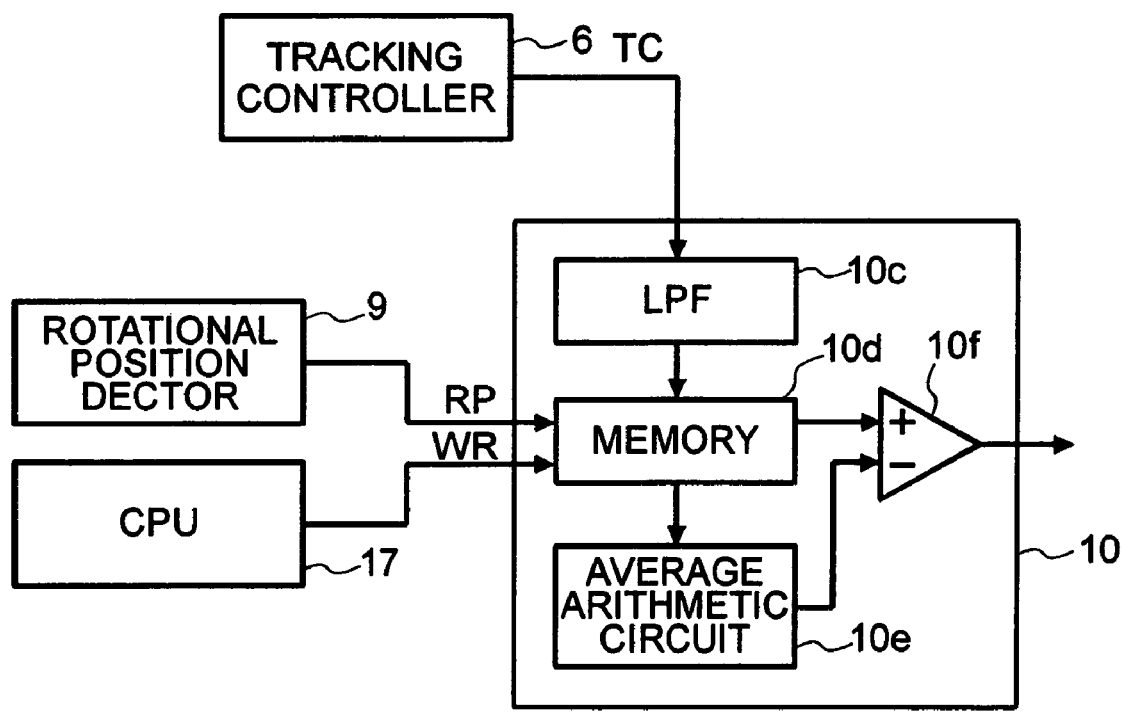
FIG. 6 is a block diagram showing another example of the radial deviation component detector shown in FIG. 2.
Figure 7:
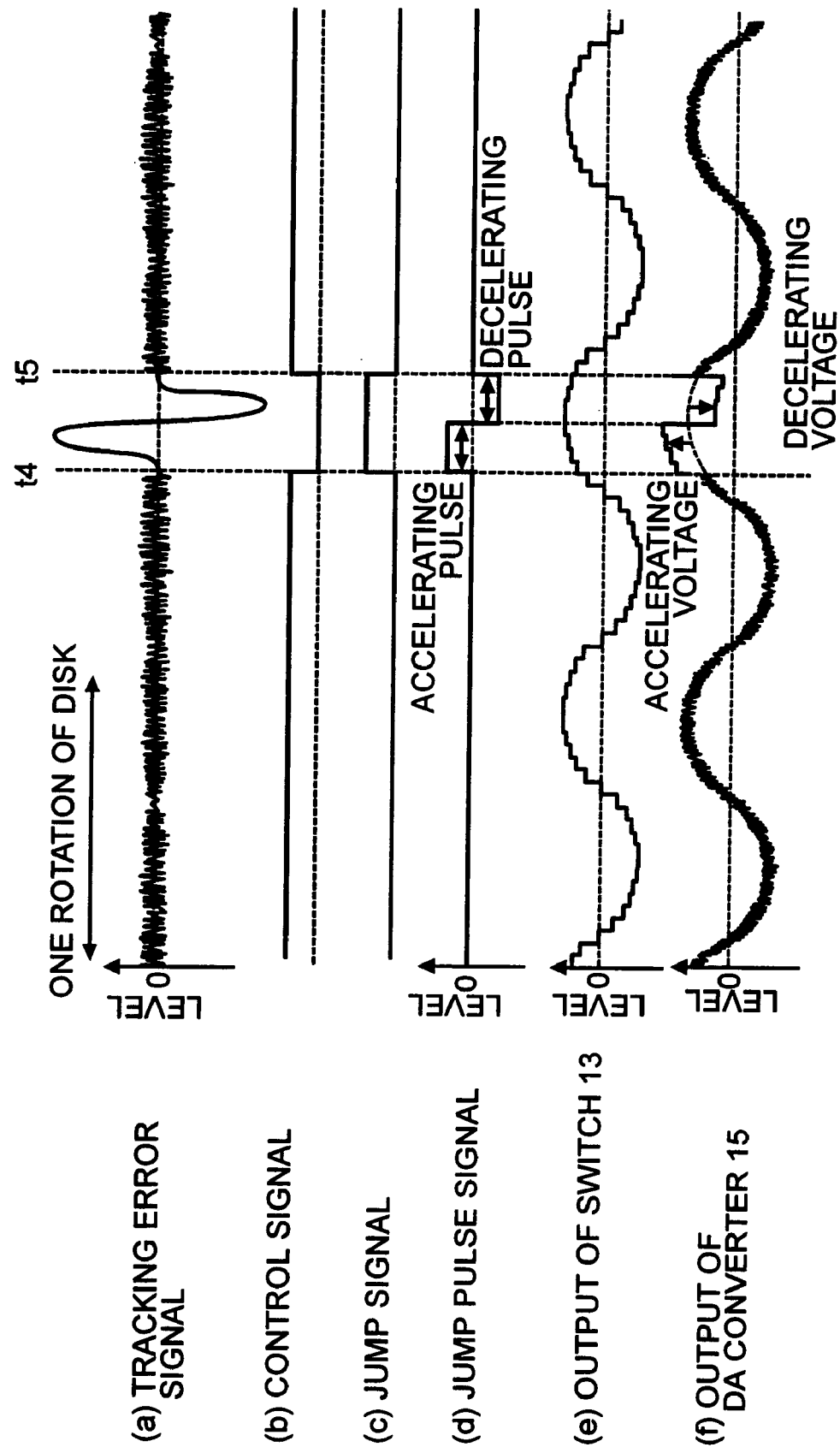
FIG. 7 is a diagram for describing a jump pulse signal added to a signal for tracking control where there is no DC offset of a radial deviation of an optical disk employed in the optical disk apparatus shown in FIG. 2.
Figure 8:
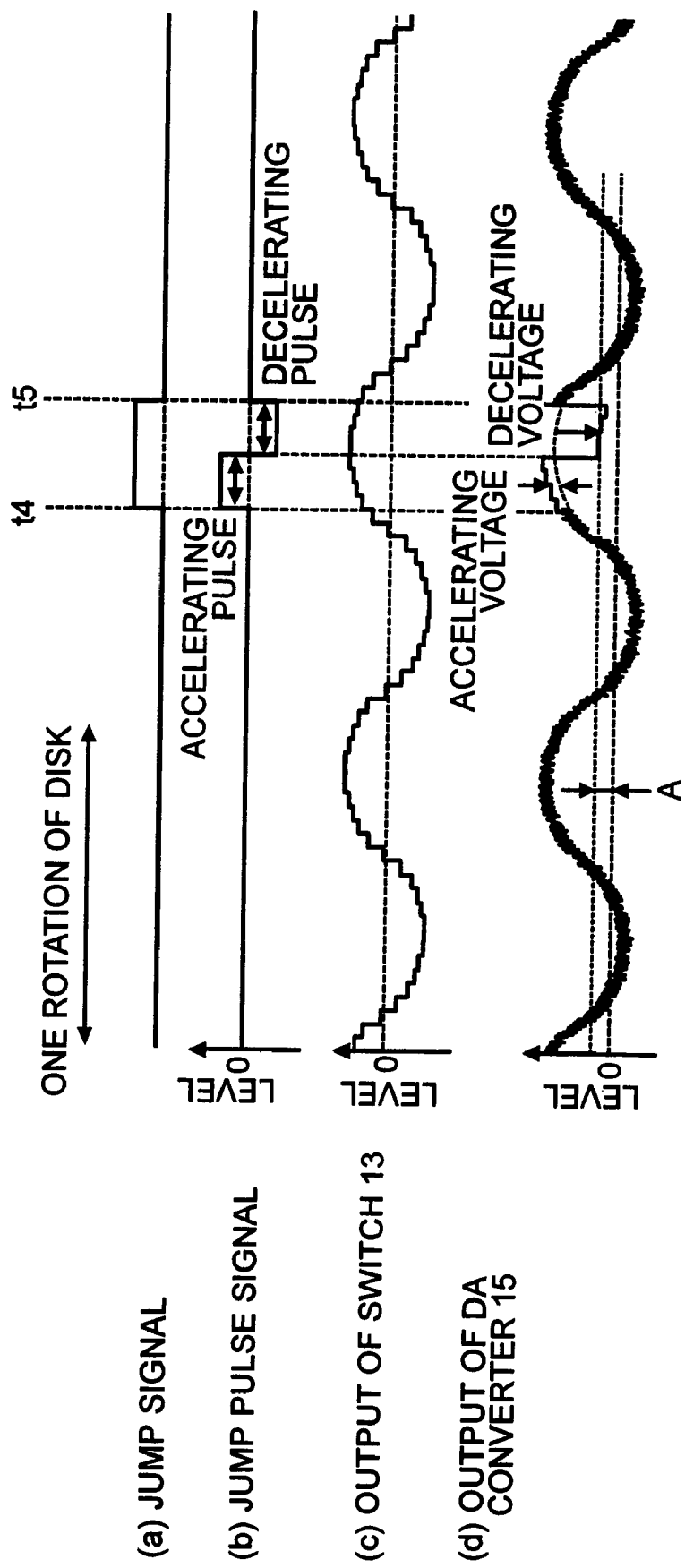
FIG. 8 is a diagram for describing a jump pulse signal added to a signal for tracking control where there is a DC offset of a radial deviation of the optical disk employed in the optical disk apparatus shown in FIG. 2.
Figure 9:
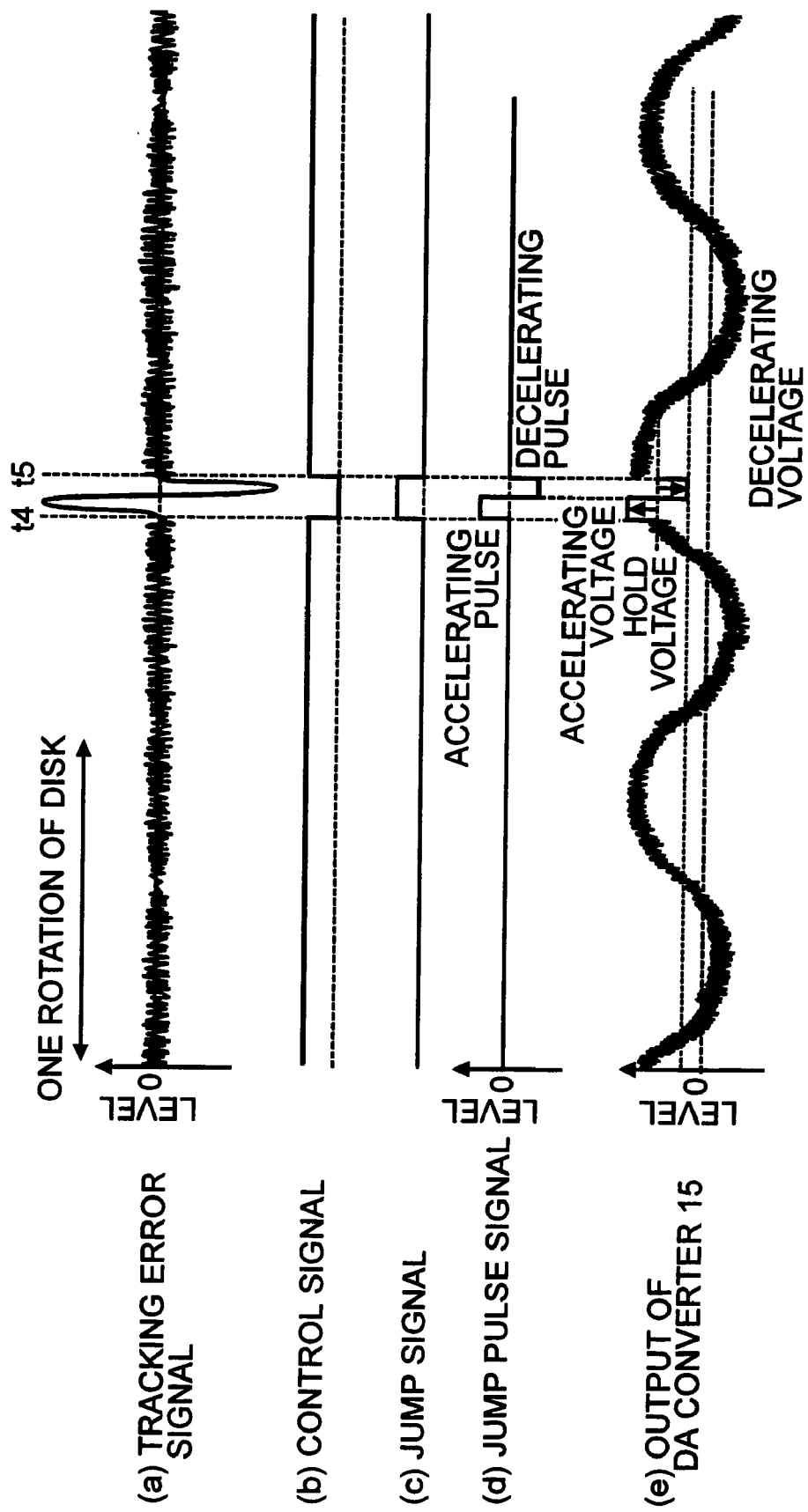
FIG. 9 is a diagram for describing a method of preventing the influence of a DC offset on a jump pulse signal added to a signal for tracking control where there exists the DC offset of a radial deviation of the optical disk employed in the optical disk apparatus shown in FIG. 2, and a track jump period is short.

In the same Figure, the radial deviation component detector 10' is equivalent to one wherein the latch 10g and the subtractor 10h are added to the configuration of the radial deviation component detector 10 shown in FIG. 6. The latch 10g latches an output signal of an LPF 10c for each timing at which a rotational position detection signal RP outputted from a rotational position detector 9 changes in value. A signal outputted from the latch lag is supplied to the subtractor 10h, where a radial deviation component EC of an AC component outputted from a subtractor 10f is subtracted from the output signal. Thus, a DC component of a tracking control signal TC is extracted from the subtractor 10h. The DC component is supplied to the corresponding DC component detector 22.

The operation of the radial deviation component detector 1a' shown in FIG. 12 will next be explained using FIG. 13.

Figure 13:
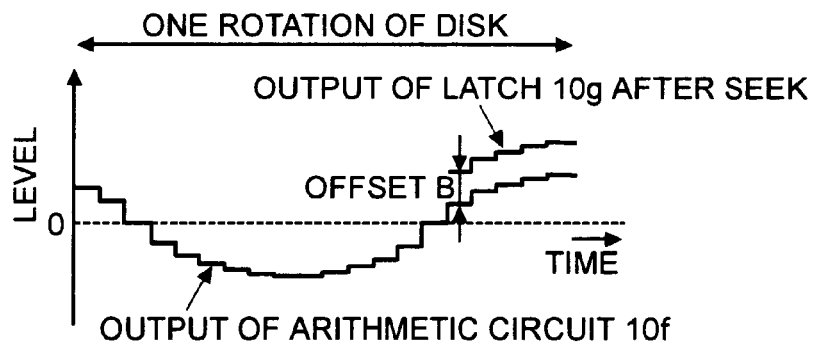
FIG. 13 is an explanatory diagram showing one operation example of the specific example illustrated in FIG. 12.

Incidentally, FIG. 13 is a waveform diagram showing the output signals of the subtractor 10f and the latch lag shown in FIG. 12.

In the same drawing, an AC component of a radial deviation of an optical disk 1, i.e., a radial deviation component EC is outputted even from the subtractor 10f of the radial deviation component detector 10' in a manner similar to the subtractor 10f shown in FIG. 6.

Figure 4:
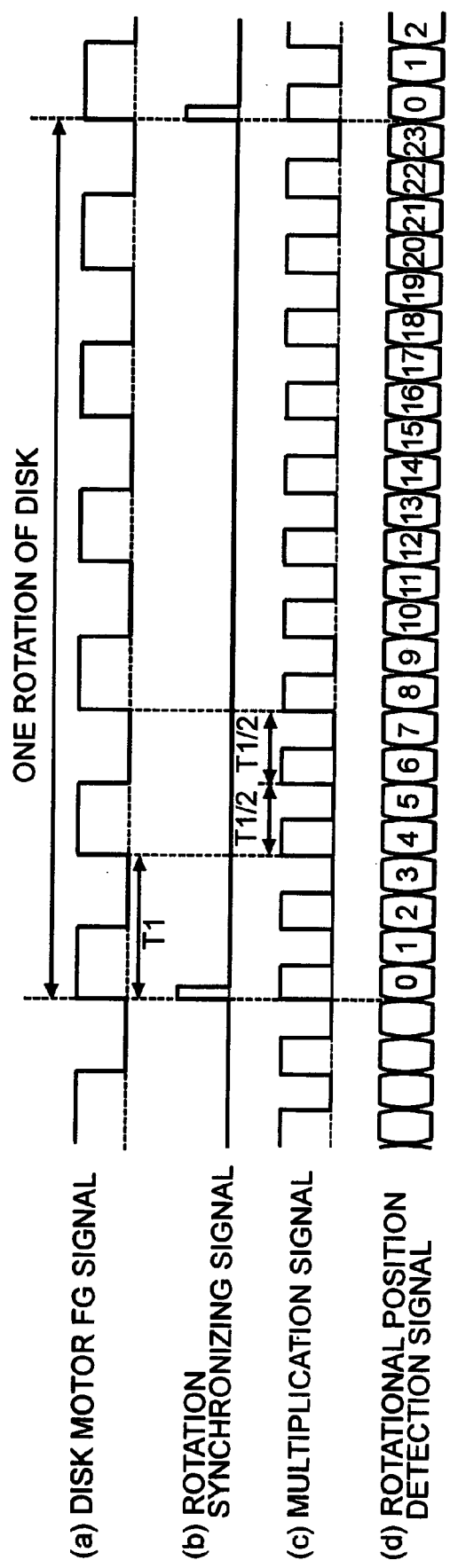
FIG. 4 is an explanatory diagram showing the operation of a rotational position detector employed in the optical disk apparatus shown in FIG. 2.
Figure 5:
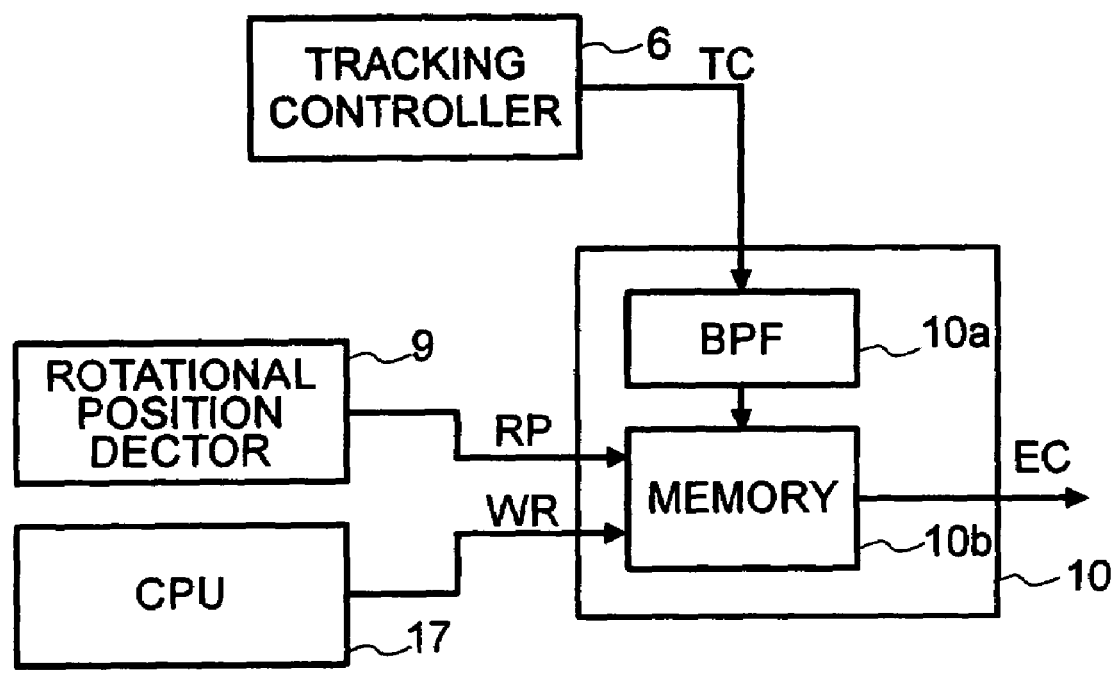
FIG. 5 is a block diagram illustrating one example of a radial deviation component detector shown in FIG. 2.

A radial deviation component containing a DC component of a tracking control signal TC is outputted from the LPF 10c. At this time, the latch lag latches an output signal of the LPF 10c for each timing at which a rotational position detection signal RP (FIG. 4) outputted from the rotational position detector 9 changes in value. Therefore, an offset B (DC component TCD referred to above) occurs between the output signal (i.e., radial deviation component EC of AC) of the subtractor 10f and the output signal of the latch 10g as shown in FIG. 13. This is extracted from the subtractor 10h, which in turn is supplied to the DC component detector 22' (FIG. 11).

Figure 14:
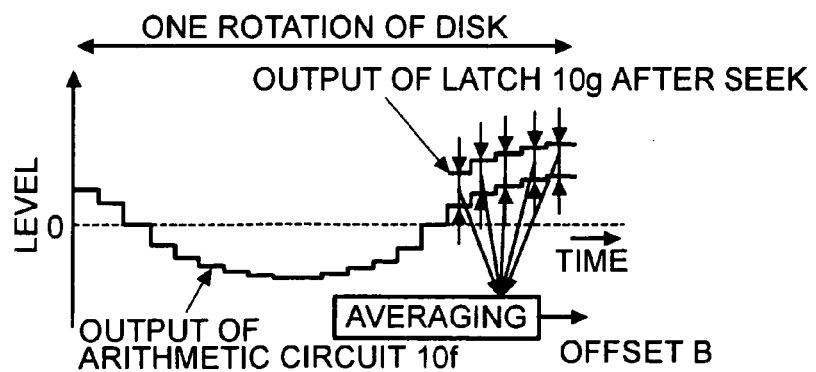
FIG. 14 is an explanatory diagram illustrating another operation example of the specific example shown in FIG. 12.

Incidentally, although the radial deviation component detector 10' shown in FIG. 12 supplies the DC component TCD extracted by the subtractor 10h to the DC component detector 22' as it is, as shown in FIG. 14, the output of the subtractor 10h subsequent to a coarse or dense seek operator is averaged by the number of data stored in a memory 10d, and the resultant average value may be supplied to the DC component detector 22' as a DC component TCD.

Incidentally, although the first and second embodiments described above are respectively related to the track jump, it is needless to say that, for example, an optical disk made up of recording layers laminated in multilayer form is also similar even in the case of a focus jump to another recording layer. In the case of a focus servo, for example, the tracking controller 6 serves as a focus controller, and the radial deviation component detector 10 serves as an axial run-out component detector, and parts other than these result in a configuration necessary for the focus servo.

Although the first and second embodiments respectively have adopted the configuration wherein the feedforward signal is computed from the servo's drive signal, the feedforward signal may be computed from a focus error signal or a tracking error signal.

According to the present invention, as described above, an optical disk apparatus can be provided which can render compatible, high-accuracy servo control based on feedforward control, and stable focus and track jumps from which the influence of axial and radial deviations is avoided, at low cost. This enables a quick access operation, and enhances reading and writing of information.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An optical disk apparatus which optically performs playback of information from a disk or recording on and playback thereof from the disk, said optical disk apparatus comprising:

an optical detector for reading the information recorded on the disk;

a position detector for detecting position information indicative of a position relationship between said optical detector and the disk, said position information depending on a state of rotation of the disk;

an AC component detector for detecting and storing an AC component of the position information obtained by said position detector and outputting the AC component of the stored position information;

a DC component detector for detecting a DC component of the position information obtained by said position detector;

a jump signal generator for generating a jump pulse signal for stepwise moving said optical detector relative to the disk; and a processor for, upon reading of information from the disk, generating a drive signal of said optical detector from the position information detected by said position detector and the AC component of the position information outputted from said AC component detector, and generating a drive signal of said optical detector from the AC component of the position information outputted from said AC component detector, the DC component of the position information detected by said DC component detector, and the jump pulse signal generated by said jump signal generator during a jump period in which said optical detector is stepwise moved relative to the disk.

2. An optical disk apparatus of claim 1, wherein:
said position information is a tracking error signal.

3. An optical disk apparatus of claim 1, wherein:
said position information is a focus error signal.

4. An optical disk apparatus which optically performs playback of information from a disk or recording on and playback thereof from the disk, said optical disk apparatus comprising:

an optical detector for reading the information recorded on the disk;

a position detector for detecting position information indicative of a position relationship between said optical detector and the disk, said position information depending on a state of rotation of the disk;

an AC component detector for detecting and storing an AC component of the position information obtained by said position detector and outputting the AC component of the stored position information;

a first DC component detector for generating a DC component of the position information obtained by said position detector and the AC component detected by said AC component detector;

a second DC component detector for detecting a DC component of the position information obtained by said position detector;

a jump signal generator for generating a jump pulse signal for stepwise moving said optical detector relative to the disk; and a processor for, upon reading of information from the disk, generating a drive signal of said optical detector from the position information detected by said position detector and the AC component of the position information outputted from said AC component detector, and generating a drive signal of said optical detector from the AC component of the position information outputted from said AC component detector, either one of the DC component of the position information generated by said first DC component detector or the DC component of the position information detected by said second DC component detector, and the jump pulse signal generated by said jump signal generator during a jump period in which said optical detector is stepwise moved relative to the disk.

5. An optical disk apparatus of claim 4, wherein:
said position information is a tracking error signal.

6. An optical disk apparatus of claim 4, wherein:
said position information is a focus error signal.

7. A method for reproduction of an optical disk, comprising the steps of:

reading information recorded on the disk;

detecting position information indicative of a position relationship between an optical detector and the disk, said position information depending on a state of rotation of the disk;

detecting and storing an AC component of the position information and outputting the AC component of the stored position information;

detecting a DC component of the position;

generating a jump pulse signal for stepwise moving said optical detector relative to the disk; and upon reading of information from the disk, generating a drive signal of said optical detector from the position information and the AC component of the position information, and generating a drive signal of said optical detector from the AC component of the position information, the DC component of the position information, and the jump pulse signal during a jump period in which said optical detector is stepwise moved relative to the disk.

8. A method of claim 7, wherein:
said position information is a tracking error signal.

9. A method of claim 7, wherein:
said position information is a focus error signal.

* * * * *